United States Patent
Wu et al.

(10) Patent No.: US 7,411,643 B2
(45) Date of Patent: Aug. 12, 2008

(54) LIQUID CRYSTAL DISPLAY DEVICE AND INSPECTION METHOD THEREOF

(75) Inventors: Ming-Zen Wu, Kao-Hsiung Hsien (TW); Fu-Yuan Shiau, Chia-I (TW); Yu-Liang Wen, Taipei (TW); Huang-Chang Wang, Tao-Yung County (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 510 days.

(21) Appl. No.: 10/906,712

(22) Filed: Mar. 3, 2005

(65) Prior Publication Data
US 2006/0197890 A1 Sep. 7, 2006

(51) Int. Cl.
*G02F 1/1335* (2006.01)
*G02F 1/1339* (2006.01)
*G02F 1/1333* (2006.01)

(52) U.S. Cl. .................. 349/113; 349/154; 349/110
(58) Field of Classification Search .................. 349/113, 349/110, 153, 154
See application file for complete search history.

(56) References Cited

U.S. PATENT DOCUMENTS

| 5,626,796 A * | 5/1997 | Tsujimura et al. ............ 252/582 |
| 6,239,856 B1 * | 5/2001 | Imura et al. .................. 349/192 |
| 6,844,976 B1 * | 1/2005 | Firon et al. ................... 359/586 |
| 7,068,339 B2 * | 6/2006 | Nakamura et al. ........... 349/152 |
| 2001/0030728 A1 * | 10/2001 | Takasugi et al. ............. 349/149 |

* cited by examiner

*Primary Examiner*—Mike Qi
(74) *Attorney, Agent, or Firm*—Winston Hsu

(57) ABSTRACT

A liquid crystal display (LCD) panel and inspection method thereof. The LCD panel includes a first substrate having a reflective material layer formed on a first side of the first substrate; a second substrate having a black matrix formed on a first side of the second substrate, the first side of the second substrate face on to the first side of the first substrate; and a liquid crystal layer sandwiched between the first substrate and the second substrate; wherein the second substrate has at least one inspection area allowing light to pass to the first side of the first substrate. The inspection method includes: passing light through the inspection area to the first side of the first substrate; and inspecting cell process parameters of the LCD panel through light reflected from the first side of the first substrate.

18 Claims, 2 Drawing Sheets

LIQUID CRYSTAL DISPLAY DEVICE AND INSPECTION METHOD THEREOF

BACKGROUND OF INVENTION

1. Field of the Invention

The present invention relates to a method for inspecting liquid crystal display (LCD) panels, and more particularly, to a method for inspecting the cell process of LCD panels.

2. Description of the Prior Art

Liquid crystal display (LCD) devices are widely employed in various applications such as portable information electronics (e.g., laptop computers and personal digital assistants), home consumer electronics (e.g., LCD TVs), aerospace apparatus, and medical electronic devices due to their merits of light weight, low power consumption, and no radiation.

An LCD panel is one of the most important components of the LCD device. The LCD panel typically comprises a color filter (CF) substrate, a thin-film transistor (TFT) substrate (or referred to as array substrate), and liquid crystal material layer sandwiched between the CF substrate and the TFT substrate.

Generally, the LCD fabrication process can be divided into three processes: an array process, a cell process, and a module assembly process. Briefly, the array process forms a TFT array on a glass substrate to produce a TFT substrate. The cell process bonds a CF substrate with the TFT substrate, and then fills liquid crystal material between the CF substrate and the TFT substrate to produce a panel module. The module assembly process combines the panel module with a backlight module, driving circuits, an outer case, and other components. In practice, the yield rates of the array process and the module assembly process are higher than that of the cell process, so that the cell process becomes a critical process of the LCD fabrication.

In the cell process, a conventional inspection method of the LCD panel is to emit a light from outside the TFT substrate to pass the TFT substrate and the LC layer so as to illuminate the CF substrate. Since the CF substrate has a black matrix (BM) formed with high reflectance metal material such as chromium (Cr), the incident light will be reflected back to the TFT substrate. Thus, in the cell process, an inspection apparatus (or an inspection staff) can observe the inside pattern of the LCD panel through the reflected light and inspect the associated parameters of the cell process such as the seal width, inhaled volume of UV-epoxy in the LC slit, etc.

In order to conform to environmental protection rules such as the European Commission Directive on Waste Electrical and Electronic Equipment (WEEE), the metal material of the black matrix formed on the CF substrate will be progressively replaced with organic materials such as resin. However, when the resin BM is adopted in the CF substrate, the aforementioned inspection method becomes unable to be put into practice. This is because the resin BM is low reflectance material and may absorb the incident light. Consequently, the inspection apparatus or staff has difficulty inspecting the inside pattern of the LCD panel through the reflected light so that it is unable to measure the associated parameters of the cell process.

SUMMARY OF INVENTION

It is therefore an objective of the claimed invention to provide a liquid crystal display device and inspection method thereof to solve the above-mentioned problems.

According to an exemplary embodiment of the present invention, a liquid crystal display (LCD) panel is disclosed comprising: a first substrate having a reflective material layer formed on a first side of the first substrate; a second substrate having a black matrix formed on a first side of the second substrate, the first side of the second substrate face on to the first side of the first substrate; and a liquid crystal layer sandwiched between the first substrate and the second substrate; wherein the second substrate comprises at least one inspection area allowing light to pass to the first side of the first substrate.

According to the exemplary embodiment of the present invention, a method for inspecting a liquid crystal display (LCD) panel is disclosed. The LCD panel comprises a first substrate having a reflective material layer formed on a first side of the first substrate; a second substrate having a black matrix formed on a first side of the second substrate, the first side of the second substrate face on to the first side of the first substrate; and a liquid crystal layer sandwiched between the first substrate and the second substrate. The method comprises: creating at least one inspection area on the second substrate; passing light through the inspection area to the first side of the first substrate; and inspecting cell process parameters of the LCD panel through light reflected from the first side of the first substrate.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
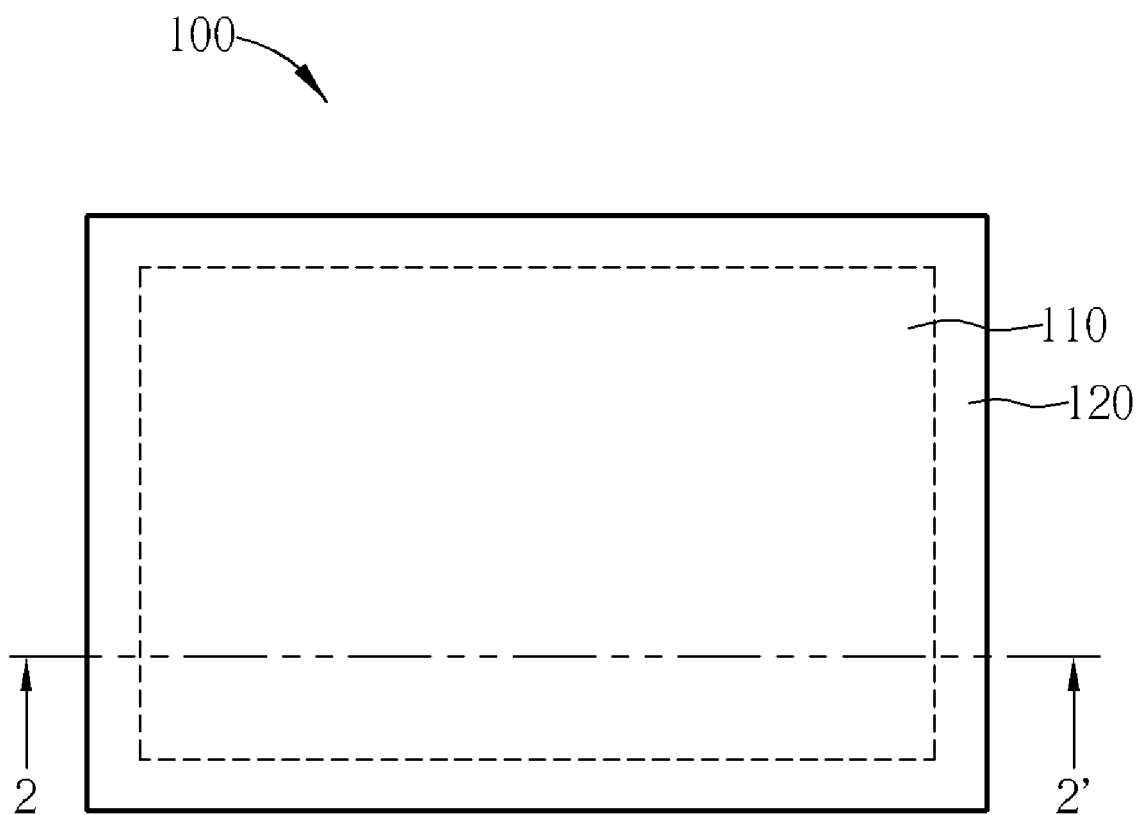
FIG. 1 is a schematic diagram of an LCD panel according to an exemplary embodiment of the present invention.
Figure 2:
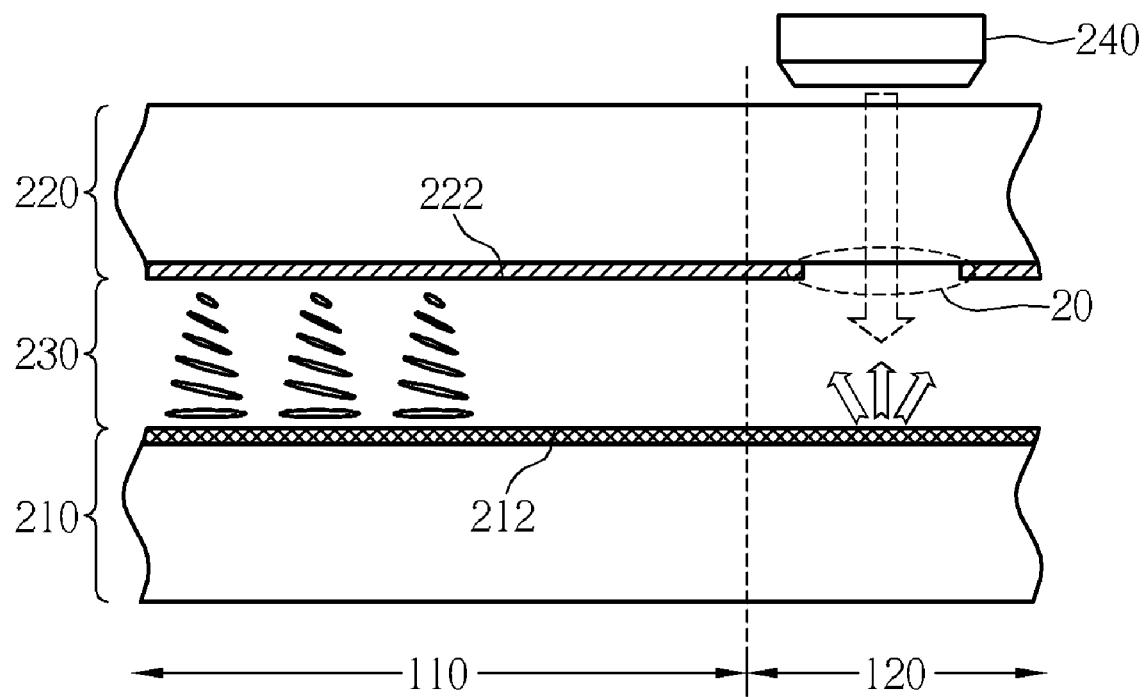
FIG. 2 is a cross-sectional schematic diagram along line 2-2' of the LCD panel shown in FIG. 1.

Please refer to FIG. 1 and FIG. 2. FIG. 1 illustrates a schematic diagram of an LCD panel 100 according to an exemplary embodiment of the present invention. FIG. 2 is a cross-sectional schematic diagram along line 2-2' of the LCD panel 100. As shown in FIG. 1, the LCD panel 100 is divided into a display region 110 and a peripheral region 120. The display region 110 is used for displaying images and the peripheral region 120 is covered within a case. As shown in FIG. 2, the LCD panel 100 comprises a thin-film transistor (TFT) substrate 210 having a reflective material layer 212 formed on a first side of the TFT substrate 210; a color filter (CF) substrate 220 having a black matrix 222; and a liquid crystal layer 230 sandwiched between the TFT substrate 210 and the CF substrate 220. The black matrix 222 of the CF substrate 220 is face on to the reflective material layer 212 of the TFT substrate 210. In the present invention, the black matrix 222 is composed of materials conforming to the environmental protection rules, such as resin or other organic materials having low reflectance.

In implementations, the reflective material layer 212 may be fomed of an aluminum (Al), chromium (Cr) or other transparent conducting oxide (TCO) having high reflectance formed on the TFT substrate 210. However, the present invention is not limited to these embodiments. For example, the reflective material layer 212 could be a metal film formed on the first side of the TFT substrate 210 with respect to the peripheral region 120 of the LCD panel 100.

In order to successfully inspect the associated parameters of the LCD panel 100 in the cell process, the present invention creates at least one inspection area, where light is allowed to pass to the TFT substrate 210 on the CF substrate 220. Preferably, the inspection area is located on the CF substrate 220 with respect to the peripheral region 120 of the LCD panel 100 so as to prevent the display function of the display region 110 from being affected. In practice, the inspection area could be an opening 20 formed on the black matrix 222 of the CF substrate 220 with respect to the peripheral region 120, as shown in FIG. 2. Therefore, when an inspection apparatus 240 is employed to inspect the inside pattern of the LCD panel 100, light emitted from the inspection apparatus 240 can pass through the opening 20 on the CF substrate 220 and the liquid crystal layer 230 to illuminate the first side of the TFT substrate 210. In practical applications, the inspection apparatus 240 may be a microscope or other parameters measuring apparatus. Additionally, FIG. 2 merely shows a portion of the LCD panel and the number of openings, such as the opening 20 formed on the CF substrate 220, is not limited to a specific number.

As mentioned above, since the reflective material layer 212 formed on the first side of the TFT substrate 210 is composed of high reflectance materials, when light emitted from the inspection apparatus 240 passes through the opening 20 to the reflective material layer 212, most light is reflected by the reflective material layer 212. Therefore, the inspection apparatus 240 or an inspection staff can observe the inside situation of the LCD panel 100 through the light reflected from the reflective material layer 212 and clearly measure the associated parameters of the cell process such as the seal width, and/or an inhaled volume of the UV-epoxy sealed on the liquid crystal slit of the LCD panel 100, etc. It should be appreciated by those of ordinary skill in the art that the aforementioned parameters are merely examples, and the process parameters that need to be inspected may be different depending upon the fabrication techniques adopted in the cell process.

As mentioned above, regardless of which liquid crystal filling method is adopted to create the liquid crystal layer 230 of the LCD panel 100 in the cell process, the inspection method disclosed by the present invention is suitable for use.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A liquid crystal display (LCD) panel divided into a display region and a peripheral region, the LCD panel comprising:
   a first substrate having a reflective material layer formed on a first side of the first substrate;
   a second substrate having a black matrix formed on a first side of the second substrate, the first side of the second substrate face on to the first side of the first substrate; and
   a liquid crystal layer sandwiched between the first substrate and the second substrate;
   wherein the second substrate comprises at least one inspection area formed on the first side of the second substrate and only formed on the second substrate with respect to the peripheral region to allow light to pass to the first side of the first substrate.

2. The LCD panel of claim 1, wherein the first substrate is a TFT substrate or an array substrate.

3. The LCD panel of claim 1, wherein the second substrate is a color filter substrate.

4. The LCD panel of claim 1, wherein the reflective material layer is a transparent conducting oxide (TCO).

5. The LCD panel of claim 1, wherein the black matrix is a resin black matrix.

6. The LCD panel of claim 1, wherein the inspection area is formed on the black matrix of the second substrate.

7. The LCD panel of claim 6, wherein the inspection area is an opening of the black matrix.

8. The LCD panel of claim 1, wherein a reflectance of the black matrix is lower than a reflectance of the reflective material layer.

9. A method for inspecting a liquid crystal display (LCD) panel divided into a display region and a peripheral region, the LCD panel comprising a first substrate having a reflective material layer formed on a first side of the first substrate; a second substrate having a black matrix formed on a first side of the second substrate, the first side of the second substrate face on to the first side of the first substrate; and a liquid crystal layer sandwiched between the first substrate and the second substrate; the method comprising:
   creating at least one inspection area on the first side of the second substrate and on the second substrate with respect to the peripheral region;
   passing light through the inspection area to the first side of the first substrate; and
   inspecting cell process parameters of the LCD panel through light reflected from the first side of the first substrate.

10. The method of claim 9, wherein the first substrate is a TFT substrate or an array substrate.

11. The method of claim 9, wherein the second substrate is a color filter substrate.

12. The method of claim 9, wherein the reflective material layer is a transparent conducting oxide (TCG).

13. The method of claim 9, wherein the black matrix is a resin black matrix.

14. The method of claim 9, wherein the step of creating at least one inspection area on the second substrate further comprises:
   creating the inspection area on the black matrix of the second substrate.

15. The method of claim 14, wherein the step of creating at least one inspection area on the second substrate further comprises:
   creating an opening on the black matrix to be the inspection area.

16. The method of claim 9, wherein the cell process parameters comprise a seal width and/or the inhaled volume of sealing compound of a liquid crystal slit of the LCD panel.

17. A liquid crystal display (LCD) panel divided into a display region and a peripheral region, the LCD panel comprising:
   a first substrate having a reflective material layer formed on a first side of the first substrate;
   a second substrate having a black matrix formed on a first side of the second substrate, the first side of the second substrate face on to the first side of the first substrate; and
   a liquid crystal layer sandwiched between the first substrate and the second substrate;
   wherein the second substrate comprises at least one inspection area only formed on the second substrate with respect to the peripheral region to allow light to pass to the first side of the first substrate.

18. A method for inspecting a liquid crystal display (LCD) panel divided into a display region and a peripheral region, the LCD panel comprising a first substrate having a reflective material layer formed on a first side of the first substrate; a second substrate having a black matrix formed on a first side of the second substrate, the first side of the second substrate face on to the first side of the first substrate; and a liquid crystal layer sandwiched between the first substrate and the second substrate; the method comprising:

creating at least one inspection area only on the second substrate with respect to the peripheral region;

passing light through the inspection area to the first side of the first substrate; and inspecting cell process parameters of the LCD panel through light reflected from the first side of the first substrate.

\* \* \* \* \*